US007555540B2

(12) United States Patent  (10) Patent No.: US 7,555,540 B2
Dunbar et al.  (45) Date of Patent: Jun. 30, 2009

(54) MEDIA FOUNDATION MEDIA PROCESSOR

(75) Inventors: Geoffrey T. Dunbar, Kirkland, WA (US); Eric Rudolph, Woodinville, WA (US); Sohail Baig Mohammed, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 10/603,328

(22) Filed: Jun. 25, 2003

(65) Prior Publication Data

US 2004/0267953 A1 Dec. 30, 2004

(51) Int. Cl.
*G06F 15/173* (2006.01)
(52) U.S. Cl. .................. 709/220; 709/238; 709/242; 709/213
(58) Field of Classification Search ................ 709/203, 709/231, 228, 230, 238, 213, 242
See application file for complete search history.

(56) References Cited

U.S. PATENT DOCUMENTS

| | | | |
|---|---|---|---|
| 4,644,532 A | | 2/1987 | George |
| 5,101,348 A | | 3/1992 | Arrowood |
| 5,625,845 A | * | 4/1997 | Allran et al. ................ 719/322 |
| 5,936,643 A | * | 8/1999 | Tindell et al. ............... 345/541 |
| 6,725,279 B1 | * | 4/2004 | Richter et al. ............... 719/313 |
| 6,957,430 B2 | * | 10/2005 | Fant et al. ................... 718/100 |
| 2004/0199652 A1 | * | 10/2004 | Zou et al. .................... 709/230 |
| 2004/0264383 A1 | | 12/2004 | Rudolph et al. |
| 2004/0267778 A1 | | 12/2004 | Rudolph et al. |
| 2004/0268369 A1 | | 12/2004 | Debique et al. |

FOREIGN PATENT DOCUMENTS

EP  1 317 109 A  6/2003
WO  WO99/46677 A1  9/1999

OTHER PUBLICATIONS

European Patent Office, "European Search Report", For European Patent Application No. 04010014.1, Feb. 10, 2006, Berlin.
Cline L.S. et al, "DirectShow RTP Support for Adaptivity in Networked Multimedia Applications", Multimedia Computing and Systems, proceedings, Jun. 28, 1998, pp. 13-22, Austin, USA.

(Continued)

*Primary Examiner*—William C Vaughn, Jr.
*Assistant Examiner*—Djenane M Bayard

(57) ABSTRACT

A system and method for a media processor separates the functions of topology creation and maintenance from the functions of processing data through a topology. The system includes a control layer including a topology generating element to generate a topology describing a set of input multimedia streams, one or more sources for the input multimedia streams, a sequence of operations to perform on the multimedia data, and a set of output multimedia streams, and a media processor to govern the passing of the multimedia data as described in the topology and govern the performance of the sequence of multimedia operations on the multimedia data to create the set of output multimedia streams. The core layer includes the input media streams, the sources for the input multimedia streams, one or more transforms to operate on the multimedia data, stream sinks, and media sinks to provide the set of output multimedia streams.

20 Claims, 6 Drawing Sheets

OTHER PUBLICATIONS

Nakajima T., "A Toolkit for Building Continuous Media Applications", Real-Time Computing Systems and Applications, proceedings, Oct. 27, 1997, pp. 268-275, Taipei, Taiwan.

J. Sztipanovits et al, "Self-Adaptive Software For Signal Processing", Communications of the association for computing machinery, ACM, May 1, 1998, vol. 41, No. 5, pp. 66-73, New York, USA.

Tavanapong W. et al, "Video Caching Network for On-Demand Video Streaming", Globecom'02—IEEE Global Telecommunications Conference, Conference Proceedings, Nov. 17, 2002, vol. 1, pp. 1723-1727, Taipei, Taiwan.

Bommaiah E. et al, "Design and Implementation of a Caching System for Streaming Media over the Internet", Proceedings of the Real-Time Technology and Applications Symposium, May 31, 2005, pp. 111-121.

European Patent Office, "Partial European Search Report", for Application No. EP 04 01 0014.01, Examiner M. Barieux, Dec. 5, 2005, Berlin.

Microsoft Corporation, "DirectX Media: Multimedia Services for Microsoft Internet Explorer and Microsoft Windows", Internet Citation, Oct. 1998.

A. Chatterjee, A. Maltz, "Microsoft DirectShow: A New Media Architecture", SMPTE Journal, Dec. 1997, vol. 106, No. 12, pp. 865-871.

*IMediaObject Interface, Microsoft DirectShow 9.0*, retrieved from http://msdn.microsoft.com/library/en-us/directshow/htm/imediaobjectinterface.asp?frame+ on May 23, 2005, 2 pages.

*What Ever Happened to ConSeal PC Firewall??, Security Software Developers, ConSeal Firewal*l. retrieved from http://www.consealfirewall.com/firewall/conseal.cfm on May 23, 2005, 2 pages.

*BlackICE PC Protection*, Windows 98, XP Home, XP Pro, 2000 Pro, Me, NT 4.0 Workstation, *Internet Security Systems*, retrieved from http:www.digitalriver.com/dr/v2/ec_MAIN.Entry17c?CID=16513&CUR=840&PN=5& on May 23, 2005, 2 pages.

*Free-Back Officer Friendly "honeypot" attracts and traps attackers, Resource Center*, retrieved from http://www.nfr.net/resource/backOfficer.php on May 23, 2005.

*Nukenabber*, Free Software Database, retrieved from http://www.unesco.kz/freesoft/Pages/1006.html on May 23, 2005 (1 page).

Atguard.com *All the best resources on the net*, retrieved from http://www.atguard.com/landing.php on May 23, 2005 (1 page).

*SignI9 ConSeal Private Desktop for Win95/98, Common Criteria*, Certified Products, retrieved from http:www.cse.cst.gc.ca/en/services/ccs/conseal/html on May 23, 2005 (2 pages).

IP Mobility vs. Session Mobility, Columbitech, 2001, (7 pages).

*At Home: McAfee Internet Guard Dog 3.0, PC The Independent Guide to Technology*, retrieved from http://www.pcmag.com/article2/0,1759,2807,00.asp on May 23, 2005 (5 pages).

Nathan Faiman, David Giese, A Rokanuzzaman, Mark Schroeder, *A Survey of the Java Media Framework 2.0*, Feb. 23, 2000, 54 pages total.

Dyakonov V.P. Popular Multimedia Encyclopedia, Moscow, "ABF" Publishing House, 1996, p. 211-Abstract.

Dorot V., at all, Explanatory Dictionary On Modern Computer Vocabulary, S.-Petersburg, BHV- Petersburg, 2001, pp. 221, 222—Abstract.

Guk M., Hardware Means of IBM PC. Encyclopedia; Sankt-Petersburg, "Peter Com" Publishing House, 1999, pp. 323-327—Abstract.

* cited by examiner

MEDIA FOUNDATION MEDIA PROCESSOR

TECHNICAL FIELD

This invention relates generally to computing and, more particularly, relates to handling multimedia data in a computing environment.

BACKGROUND OF THE INVENTION

As the abilities of computers expand into entertainment genres that once required separate electronic components, increased efficiency and user-friendliness is desirable. One solution is Microsoft's® DirectShow®, which provides playback of multimedia streams from local files or Internet servers, capture of multimedia streams from devices, and format conversion of multimedia streams. DirectShow® enables playback of video and audio content of file types such as Windows Media Audio, Windows Media Video, MPEG, Apple® QuickTime®, Audio-Video Interleaved (AVI), and WAV. DirectShow® includes a system of pluggable filter components. Filters are objects that support DirectShow® interfaces and can operate on streams of data by reading, copying, modifying and writing data to a file. The basic types of filters include a source filter, which takes the data from some source, such as a file on disk, a satellite feed, an Internet server, or a VCR, and introduces it into the filter graph which is a connection of filters. The filter graph provides a transform filter, which converts the format of the data, a sync and source filter which receives data and transmits the data; and a rendering filter, which renders the data, such as rendering the data to a display device. The data could also be rendered to any location that accepts media. Other types of filters included in DirectShow® include effect filters, which add effects without changing the data type, and parser filters, which understand the format of the source data and know how to read the correct bytes, create times stamps, and perform seeks.

Therefore, all data passes from filter to filter along with a good deal of control information. When filters are connected using the pins, a filter graph is created. To control the data flow and connections in a filter graph, DirectShow® includes a filter graph manager. The filter graph manager assists in assuring that filters are connected in the proper order, but the data and much of the control do not pass through the filter graph manager. Filters must be linked appropriately. For example, the filter graph manager must search for a rendering configuration, determine the types of filters available, link the filters in the appropriate order for a given data type and provide an appropriate rendering filter.

While filters allowed a great deal of reuse of programs, the use of filters also created some unanticipated problems. One of the problems created by filters is the large number of API's for the filters which came into being. Each filter essentially has a separate API. Therefore, a given filter must be capable of interfacing to the API for every filter to which it might attach. Also, the use of filters creates the problem of shutting down a given filter problematic. When a given filter in a graph is shut down, any filter that interfaces with the shut down filter requires a different associated interface. In general, programming a filter to gracefully handle the loss of an interface is difficult, as the state of the filter can be unknown when the interface is lost. The loss of interfaces, therefore, tends to lead to unpredicted behavior in the filters and ultimately to ill behaved programs. Further, the overall control in Direct-Show® is distributed between two blocks. The interface between the filters controls the data flow while the filter manager controls the instantiation and removal of filters. Distributing the control in this manner makes software design cumbersome as there are inevitably some control functions which cross the boundary between the blocks. Another problem with DirectShow is that the filters shoulder the responsibility of media format negotiation and buffer management functionality. Filters communicate with other filters to accomplish this task. The dependency on filters causes applications building on DirectShow susceptible to bugs and inefficiencies that could be programmed into a filter. Thus, a badly written filter could easily bring down the filter graph and an application associated with the filter graph.

There is a need to address the problems with the Direct-Show® architecture. More particularly, there is a need to improve control of processing of multimedia data and address the dependency on filters for communications among multimedia components.

SUMMARY OF THE INVENTION

Accordingly, systems and methods of processing multimedia data separate control functions and from data handling functions, thereby providing efficient processing of multimedia streams. A method provides for creating a topology of connections between one or more multimedia components in a topology generating element, the topology describing a set of input multimedia streams, one or more sources for the input multimedia streams, a sequence of operations to perform on the multimedia data, and a set of output multimedia streams. The method further provides for transmitting the topology to a media processor, and passing data according to the topology, the passing governed by the media processor. The topology generating element, which can be a topology loader or an application, performs outside the scope governed by the media processor. The media processor governs performing the sequence of multimedia operations on the multimedia data to create the set of output multimedia streams. In one embodiment, the multimedia components are software objects.

Another embodiment provides a method for changing a first topology in use by a media processor while the media processor is active. According to the method, the media processor preserves the present state of the media processor, receives instructions to convert the first topology into a second topology, and updates the first topology to the second topology in accordance with the instructions. The instructions can contain the difference between the first topology and the second topology. After updating the first topology to the second topology, the media processor resumes the interface activity after updating the first topology to the second topology, sends messages to an application. Before the topology changes the media processor can be configured to allow message calls. The instructions to convert the first topology can be received via a message from an external source to initiate the process of changing the first topology.

Another embodiment is directed to a method of determining how to use a set of multimedia components to perform a sequence of multimedia operations on one or more streams of multimedia data. The method is recursive in that the use of the multimedia components is determined by querying prior components for available sample data. The method includes locating one or more multimedia components with outputs connected to an input of a sink device, querying the multimedia components to determine if a sample is available, the querying can include checking inputs to the multimedia components if a sample is not available. If the inputs do not have a sample available, checking a media source feeding the multimedia components for a sample. If the media source does not have a sample available, the method provides for performing an end of file function or declaring an error condition. If a sample is available, the method provides for moving the sample to a next multimedia component of the multimedia components.

Another embodiment is directed to a method for retrieving a section of a media stream, which can be referred to as "scrubbing." The method includes caching the section of a media stream. The cached section of the media stream can contain a presentation point of the media stream. The method then provides for receiving a request from an external source to the media processor to retrieve the cached section of the media stream, and searching to identify whether the section of the media stream was cached. If the section of the media stream was cached, the method provides for transferring the requested cached section. The caching can be according to user settings in an application, which can include whether or not to cache, a number of frames and a number of samples to be contained in the cached section. In one embodiment, the cached section is continuous video data.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
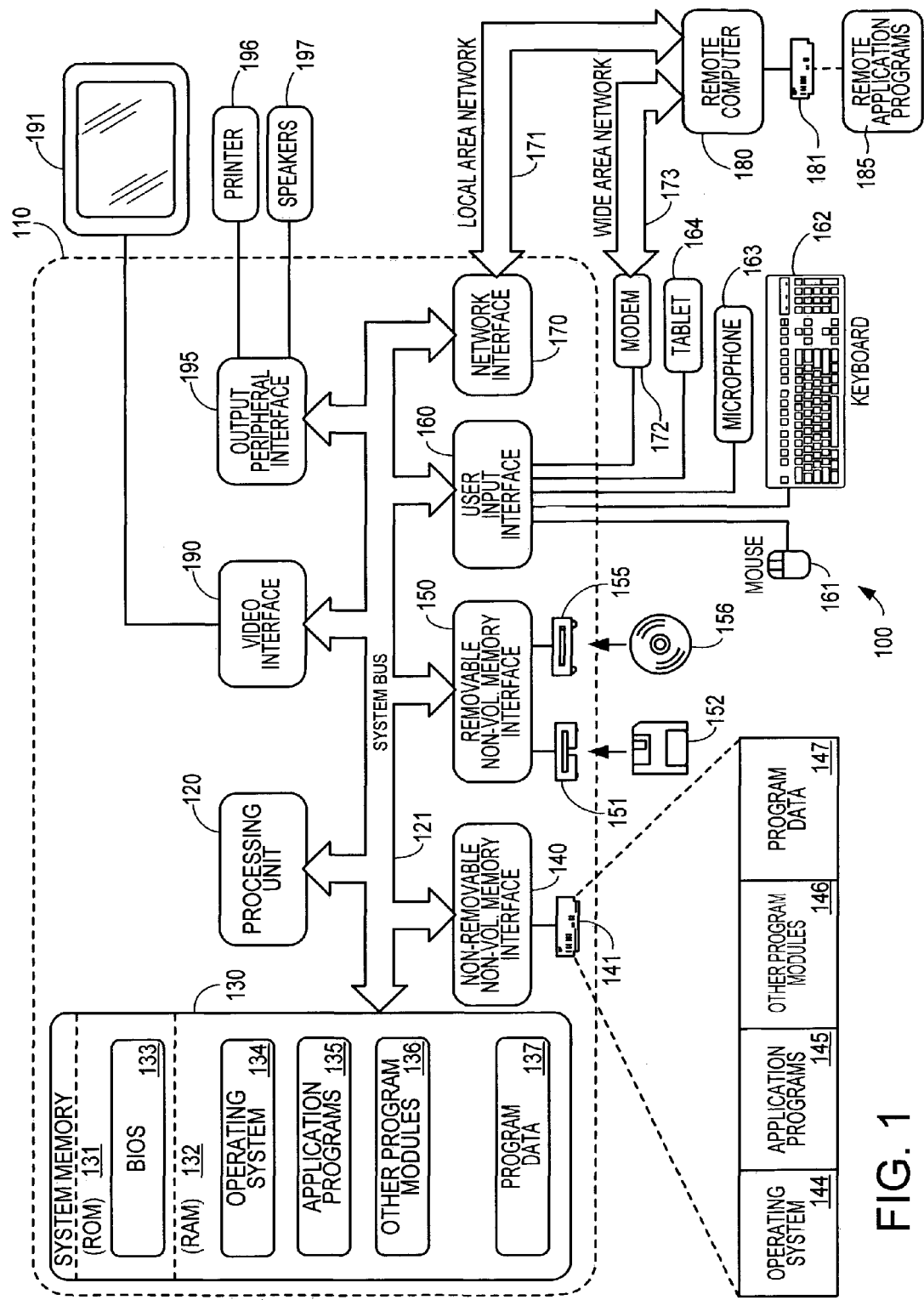
FIG. 1 is a block diagram generally illustrating an exemplary distributed computing system with which the present invention can be implemented.

Turning to FIG. 1, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not equivalent to any of the computing devices 10-17 illustrated in FIG. 1. The exemplary computing device 100 can implement one or more of the computing devices 10-17, such as through memory partitions, virtual machines, or similar programming techniques, allowing one physical computing structure to perform the actions described below as attributed to multiple structures.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 operates in a networked environment, such as that shown in FIG. 1, using logical connections to one or more remote computers. FIG. 1 illustrates a general network connection 171 to a remote computing device 180. The general-network connection 171 can-be any of various different types of network connections, including a Local Area Network (LAN), a Wide-Area Network (WAN), networks conforming to the Ethernet protocol, the Token-Ring protocol, or other logical or physical networks such as the Internet or the World Wide Web.

When used in a networking environment, the computing device 100 is connected to the general network connection 171 through a network interface or adapter 170, which can be a network interface card, a modem, or similar networking device. In a networked environment, program modules depicted relative to the computing device 100, or portions thereof, may be stored in the remote memory storage device. Those skilled in the art will appreciate that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skilled in the art will appreciate that several of the acts and operation described hereinafter may also be implemented in hardware.

Figure 2:
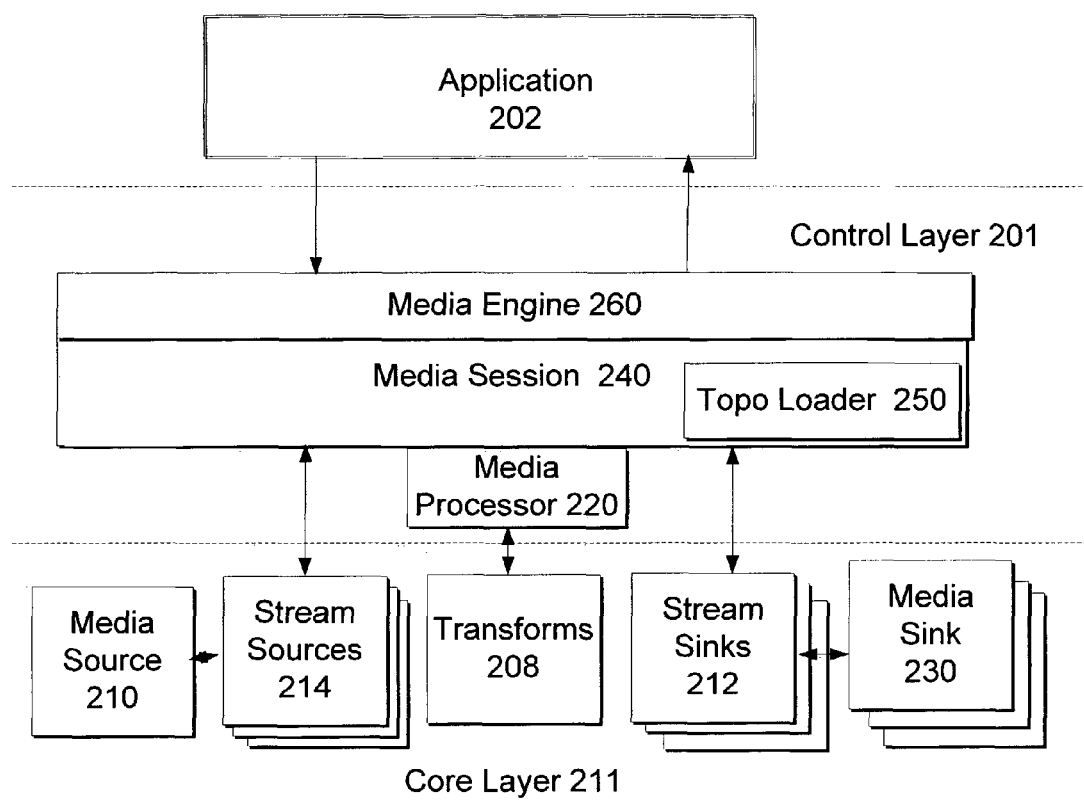
FIG. 2 is a block of a media foundation system in accordance with embodiments of the present invention.

Referring to FIG. 2, a block diagram illustrates a media foundation system 200. Core layer 211 includes media source 210, transforms 208, and media sink 230. Media foundation system 200 is shown coupled to application 202 to receive and send media streams. Control layer 201 includes media engine 260, media session 240, media processor 220 and topology loader 250. Data flows through the media foundation 200 by beginning with a media source 210 into media session 240 and then into media processor 220. From media processor 220 the data will flow into transforms 208 and back to media processor 220 one or more times. The data will then flow from media processor 220 into media session 240 and then into stream sinks 212. Media engine 260 provides control to an interface to the application 202 and provides overall control of control layer 201, and the topology loader 250 ensures that events prescribed in a topology occur. The media foundation system 200 provides interfaces and a layout for connecting streaming media objects.

The core layer includes media source component 210, and media sink component 230. Also included are stream sources 214 which operate under the control of media source 210; and stream sinks 212 which operate under the control of media sink 230. Stream sources 214 transfer multimedia data from storage or capture devices to control layer 201 and stream sinks 212 transfer multimedia data from media engine 260 to rendering or storage devices (not shown). Media source component 210 implements state machines which provide control of stream sources 214. Media sink component 230 implements state machines which provide control of stream sinks 212. In each case, the state processing and data movement are separated.

Media source 210, media sink 230 and transforms 208, together with stream sources 214 and stream sinks 212 include objects that make up part of core layer 211. These components are programmatic objects which implement a predefined function. Media source 210 and stream sources 214 provide either capture or retrieval of multimedia data and provide this data to media session 240. The sources of data include but are not limited to a disk such as a hard drive, CD, or DVD, the internet, random access memory (RAM), video RAM, video cameras, scanners, still image cameras, and microphones. Media sink 230 includes objects which control the transfer of data in stream sinks 212. Stream sinks 212 consist of objects which accept data from control layer 201 for storage or rendering. Sinks of data include but are not limited to a disk such as a hard drive, writable CD, or writable DVD, a broadcast over a computer network, such as the Internet, printers, display devices such as monitors, and speakers. The data for both the media source 210 and media sink 230 can be transported over many mediums including but not limited to Ethernet, wireless networks, analog cables before digitization, USB, IEEE 1384, parallel port, serial port, and disk interfaces.

Transforms 208 include objects which manipulate the data. These transforms can include encoders, decoders, splitters, multiplexers, audio processing such as bass and treble control for adding effects such as reverb, video processing such as adjusting color masks, image sharpening, and contrast or brightness control. The encoders and decoders handle both audio, video, and image data. Video data types can include MPEG, Apple Quicktime®, AVI, and H.263 and Windows Media Video (WMV). Note that many of the video standards are true multimedia standards in that these standards have provisions to transfer both audio and video. Image data formats include JPEG, GIF, Fax, and Tiff. Audio standards can include MP3, PCM, ADPCM, as well as standards for CD playback and Windows Media Audio (WMA). Transforms 208 can be used to convert data from one format to another. For example, a transform 208 can convert a JPEG image into a format suitable for display on a monitor.

Figure 3:
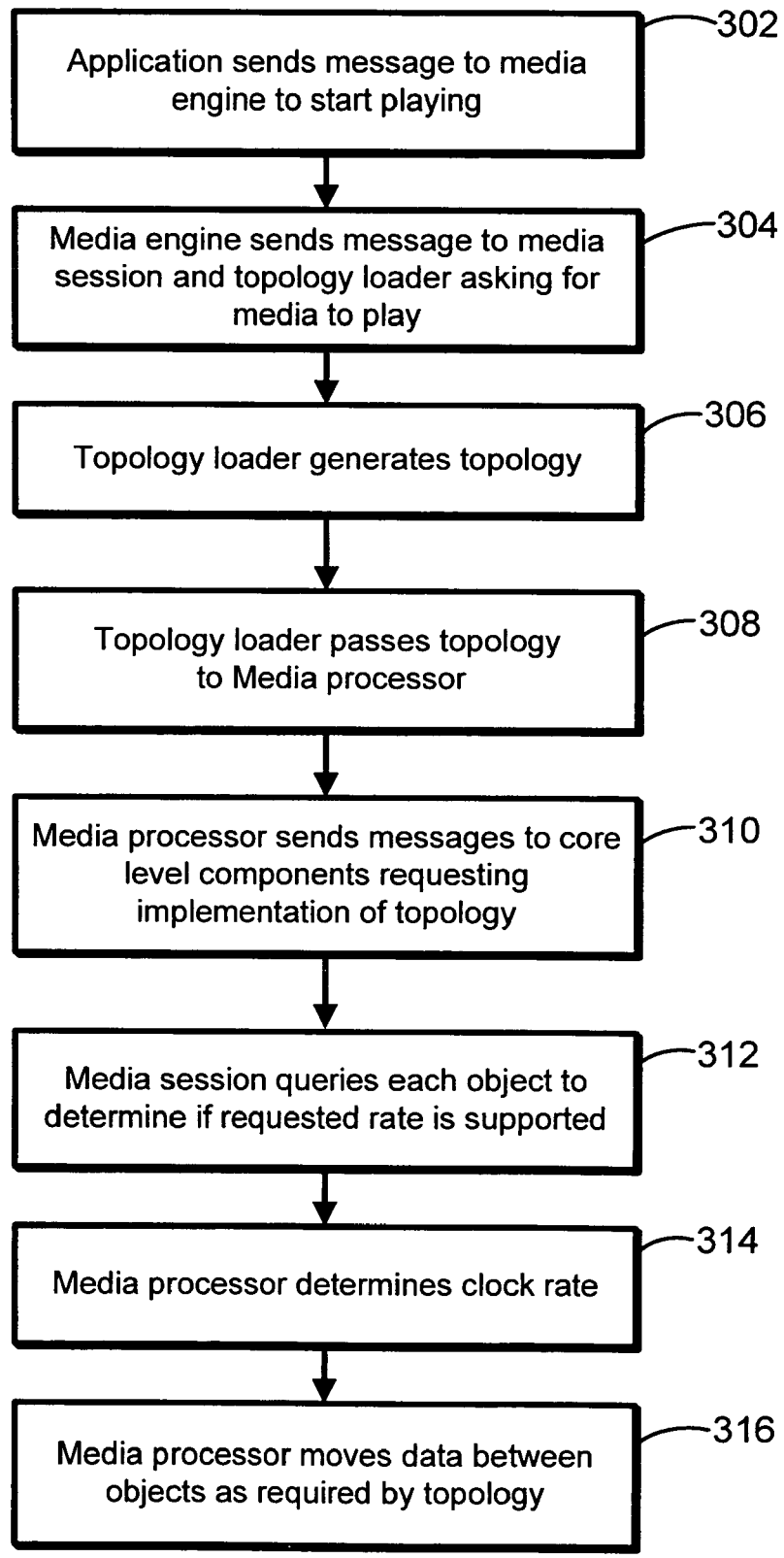
FIG. 3 is a flow chart of an example of data flow in the media engine required to play a DVD in accordance with embodiments of the present invention.

Turning to FIG. 3, a flow chart of a typical multimedia process is show. Assume a user wishes to view a DVD. An application will be launched to allow the user to view a DVD. The application has a graphical user interface (GUI) allowing the user to perform such functions as play, stop, pause, fast forward, and rewind. In block 302, the user selects the play button and the application sends a message to the media engine component of media foundation. The message contains the information that the application wishes to view a DVD. In block 304, the media engine sends messages to media session and the topology loader telling these blocks to start playing a DVD. In block 306, the topology loader sets up the topology. The topology provides a path that the data streams take through the media and stream sources, the transforms, and the media and stream sinks. The topology loader will pass this topology on to the media processor. The media processor sets up and implements the topology. In block 308, the media processor will send messages to the core layer components to instantiate the objects called out by the topology loader. In addition to calling the core layer objects in the proper order and passing data between the objects, the data rate is controlled such that the audio and video are synchronized and rendered at the desired rate. The data rate can be determined in the media session. In block 310, the media session will query each object to determine that the desired rate can be supported and pass a message to the media processor with the rate information. In block 312, the media processor determines the clock rate of a rate determining object in the core level, usually a media sink, and sets this clock rate. In block 314, the media processor then calls the core level and passes data between objects as required by the topology. The data is ultimately rendered to the speakers and monitor by media sinks.

The media processor is the object that performs the data flow as described by a topology. The media processor is initialized with a topology describing the data flow, and exposes itself to the user via the media source interface. Thus, once configured, the media processor actually looks like a media source to the user. Media processor exposes a number of media streams based on the topology. There will be one media stream for each output node in the topology.

Figure 4:
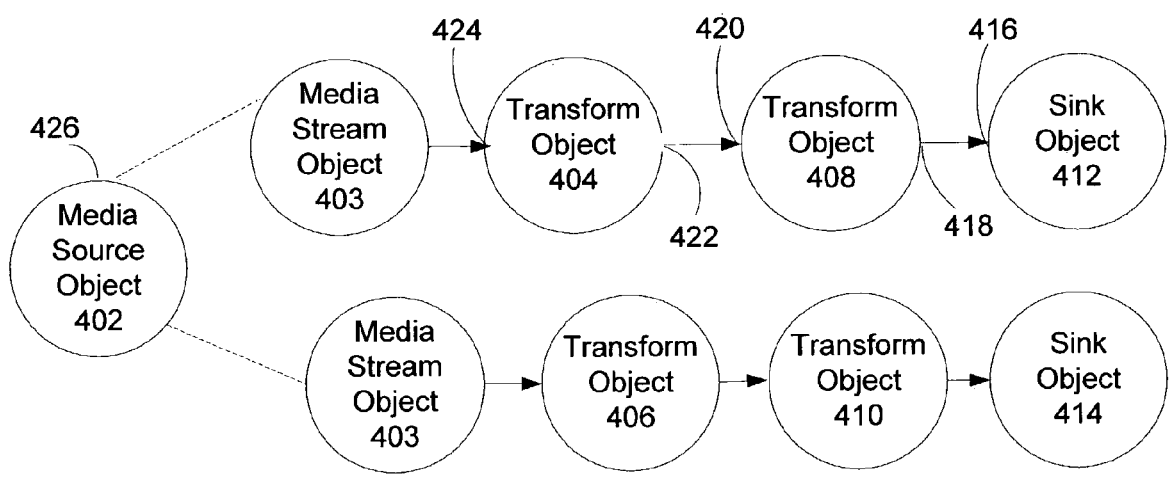
FIG. 4 is a block diagram illustrating how data flow is implemented in the media processor in accordance with embodiments of the present invention.

FIG. 4 shows a topology. The data flow is driven by user calls to fetch a sample on one of the media processor's media streams. Consider the upper path in FIG. 4. The data flow works by starting with an output object in the topology (sink object 412) and walking recursively through a list of objects which generate data. The process in the upper path of FIG. 4 starts with sink object 412. The only output node connected to input 416 is output 418 connected to transform object 408. If transform object 408 has a sample available, then media processor 220 reads the sample and writes the sample to sink object 412. If transform object 408 does not have a sample available, then media processor 220 looks at the input of transform object 408, which is shown as 420, which is connected to output 422 for transform object 404. Transform object 404 is then queried for a sample. If a sample is available, the sample is read by media processor 220 and written to transform object 408. If no sample is available, then media processor 220 again moves one node to the left, and queries media stream object 403 for an available sample. Media stream object 403 are loaded via source object 402. If a sample is available from media stream object 403, the sample is retrieved from media stream object 403 to transform object 404. If no sample is found, then media processor will request that media stream object 403 read a source. Any time that a valid sample is found and passed to the next block, the process starts over. The process is completed by operating with the objects once the data is located. Transform object 404 operates on the data and passes the transformed data to transform object 408 to operate on the data and then passes the transformed data to sink object 412 to complete the process of generating a sample at the output. In one embodiment, the media processor keeps a list objects that have inputs to other objects. With this list, the media processor can look at the output object and determine from which object the media processor needs to retrieve media data.

In one embodiment, the list tracks the type of node holding the objects and other information about the objects. Each type of object has a different manner of generating data at the media processor's request. Transform nodes contain transform objects, which have a set of calls that are used to provide input media samples and generate output media samples. Tee nodes provide an indication for the media processor to copy samples as needed. Tee nodes should be described before we start referring to them. Source nodes have a media stream, which provides an asynchronous call by which the media processor asks the stream for data, and the stream later provides the data when the data is available.

Embodiments are directed to a data flow using media processor 220. In an embodiment, the data flow is asynchronous. That is, a user makes a call to generate data for a given media stream, and media processor 220 then generates the data, and notifies the user when the data is available. In one embodiment, components referenced by a topology do not make calls to each other. Rather, media processor 220 is responsible for all communication. By having a centrally located communication method data flow is consistent, and there is greater interoperability between components.

In one embodiment, media processor 220 does not address each aspect of the data flow. For example, in one embodiment, media processor 220 has no control over media samples.

In terms of the overall media foundation architecture, the media processor is commonly used in the context of the media engine. Media engine 260 is the component that an application 202 uses directly when using Media Foundation architecture shown in FIG. 2. Media engine 260 can be configured by the application 202 specifying the source of data (generally a filename, URL, or device, or a complex configuration that specifies multiple simple sources), and the destination of the data (such as an output multimedia file, or a rendering device like a video card). Media engine 260 is then controlled at runtime through such commands as Start, Stop, etc. Thus, media engine 260 uses the other Media Foundation components to accomplish this functionality, and is the main object that an application 202 uses to perform multimedia operations. Media processor 220 can be controlled directly by a media processing session, and used in conjunction with topology loader 250. The media processing session is the object media engine 260 uses to operate media sources 210, media processor 220, media sinks 230, and topology loader 250.

In one embodiment, media processor 220 supports tee objects and transform objects with more than one input or output. For example, a transition is generally implemented as a transform object, and the transform object would have two inputs and one output.

In the case in which a node has more than one input, the media processor 220. performs the following method: when trying to generate input data for the transform, media processor 220 selects just one of the inputs based on the timestamps of the previous media samples and generates data for that input. Every time media processor 220 provides an input sample to a transform object, media processor 220 attempt to generate output data for the transform. If the transform does not generate any data, media processor 220 provides an input sample to the transform object, possibly the same input that was already used.

In the case where a node has more than one output, media processor 220 needs more information about the outputs. The topology loader will indicate the properties of the output, which can be either primary or discardable.

The primary output is used as the primary memory allocator for samples passed to the input nodes. Discardable outputs are not guaranteed to get all samples that go into the node; if the user hasn't requested a sample for that output when an input sample has been generated, then the discardable output will simply not receive the sample. The discardable concept is useful in scenarios wherein it is preferable to lose data rather than slow processing down, such as a preview display in an encoder application.

An important capability of a multimedia system is the ability to change the properties of the multimedia session while running. For instance, a playback application might switch from playback in windowed mode into full screen mode. Or an encoding application might switch from encoding one camera to another camera. The disclosed media foundation system handles these capabilities via a change in the topology.

However, in an embodiment, media processor 220 never changes the topology itself; topology changes are always be done by another component and then communicated to the media processor. If media processor 220 is being controlled by media session 240, media session 240 is responsible for using the topology loader to create full topologies for media processor 220 and then communicating these full topologies to the media processor. However, in one embodiment any direct user of the media processor can also perform topology changes on the media processor.

In one embodiment topology changes can be static or dynamic. A static topology change takes place when media processor 220 is not processing data and represents a full replacement of the old topology with the new topology. A dynamic topology change takes place when media processor is running and also may change only part of the topology while maintaining other parts of the topology intact.

Figure 5:
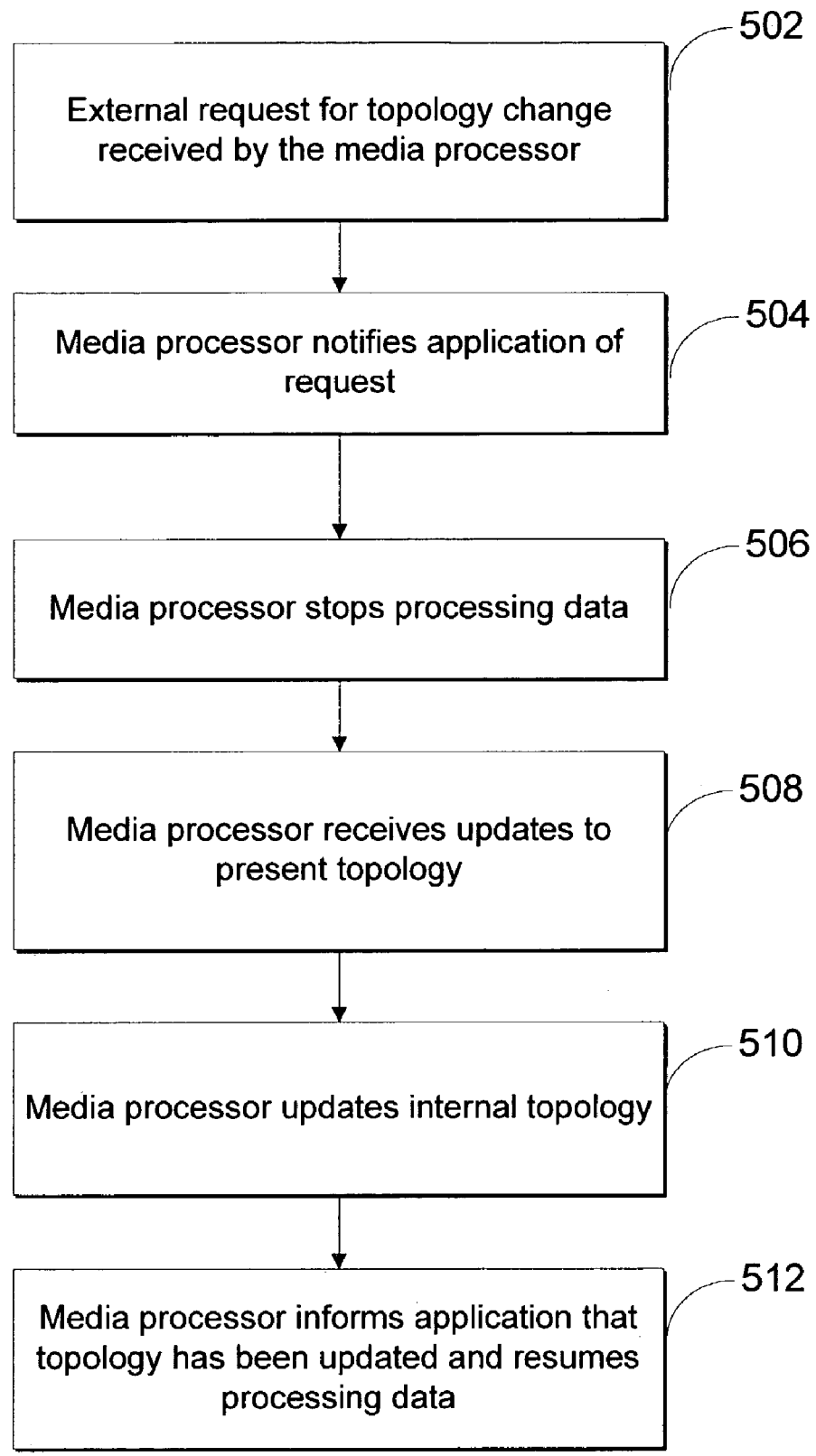
FIG. 5 is a flowchart of a dynamic topology change in the media processor in accordance with embodiments of the present invention.

There are several mechanisms through which a dynamic topology change can be generated. The first is media source generated. In this case, one of the media sources internal to media processor 220 detects that its format has changed in some manner; a media stream has changed, a media stream has ended, or a new media stream has been created. The media source notifies media processor 220 that the change has occurred; media processor 220 forwards this notification on to the user to process, and stops processing data. The user is responsible for creating the new topology and sending it on to the media processor. The second is topology generated. In this case, the topology itself contains information that it will change at some point; one or more of the topology objects has an expiration time set as a property. When media processor 220 detects that the expiration time has been reached, it notifies the user, and stops processing data. The final type is user generated. In this case the user simply sets a new topology on media processor 220 while media processor 220 is running. In all cases, media processor 220 reacts to the topology change in the same manner:

Referring to FIG. 5, the steps in a dynamic topology change are shown in a flowchart. In block 502 a topology change is requested of the media processor. In block 504, media processor 220 first makes any notifications to the user that are required, for instance that a media source has changed formats. In block 506, media processor 220 stops processing and maintains its state such that it can resume processing on any nodes that remain in the new topology. Media processor 220 also puts itself into a state such that any attempt by the user to continue running will simply wait until the topology change is complete. In block 508, media processor 220 then receives the new topology. The new topology could come from the topology loader or the application. In block 510, media processor 220 updates its internal topology to match the new topology. In block 512, media processor 220 informs the application that the new topology is in place and resumes processing.

Media processor 220 is designed to support running at arbitrary rates. The media source interface is a pull interface; that is, the user can pull samples as quickly as possible. So from this sense media processor 220 automatically supports arbitrary rates. However, in many cases the media sources or transforms also have optimizations or improved behavior when they know the rate. Thus, when the user tells media processor 220 explicitly to run at a given rate, media processor 220 will query any media sources and transforms in the topology to determine their rate capabilities. If the given rate is supported by all media sources and transforms, media processor 220 will then set the rate of all media source objects and transform objects such that the media sources and transform objects can make appropriate changes to their behavior. Running the multimedia stream in reverse is a special case of a rate change.

Scrubbing is defined as being able to quickly seek within the multimedia presentation and retrieve a small number of media samples at that position. Due to the complexity of decoding multimedia data, scrubbing is more complex than seeking into the multimedia presentation and simply takes too long. This is particularly true for compressed video data, which often has a large time delay between independently decodable key frames.

To optimize scrubbing, media processor 220 has logic to enable caching a certain amount of pre-decoded samples, generally near the current position of the presentation, such that a seek to one of these pre-decoded samples will allow media processor 220 to generate the desired sample in a timely manner. This caching behavior is configurable by the application, to allow the tradeoff between memory usage and good scrubbing performance.

Figure 6:
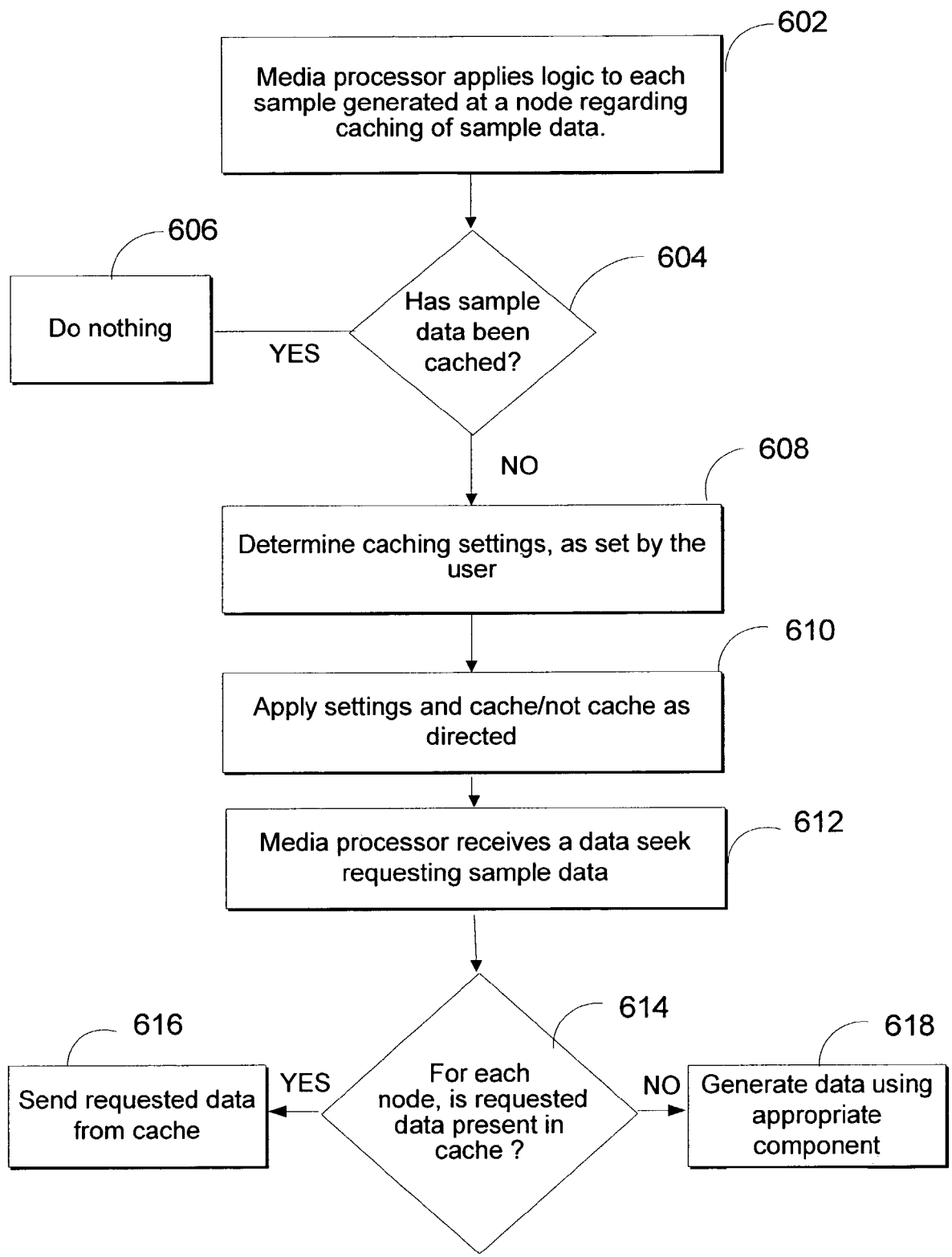
FIG. 6 is a flowchart exemplifying a process of scrubbing in accordance with embodiments of the present invention.

FIG. 6 is a flowchart of the process used to optimize scrubbing. Block 602 provides that media processor 220 applies logic to each sample generated at a node regarding caching of sample data. Decision block 604 provides that when deciding whether to cache sample data, media processor first determines if the sample data has been cached. If yes, block 606 provides for doing nothing. If no, block 608 provides for media processor 220 to determine caching settings, as set by the user. The caching settings can include an identification of nodes for which nodes caching is desired, the frequency of caching, the maximum amount of memory to use for caching, and the like. Block 610 provides for applying the settings to determine to cache the sample or not and caching as necessary.

Block 612 provides for media processor 220 to receive a data "seek" issued by application 202. A data seek can be a request, for example, for the next frame of data to enable a frame by frame advance of a video stream. Upon receiving the seek, media processor 220, for each node, checks to see if the requested data is present in cache in decision block 614. If present, block 616 provides for sending the data back to application 202 instead of regenerating the sample data. If not present, block 618 provides for using the appropriate transform, source or other appropriate component to generate the sample data.

Some video decoders support a mode in which pre-decoded samples can be used to initialize the state of the decoder. In this case, it is possible to cache only a fraction of the pre-decoded samples and still maintain good scrubbing performance. For instance, if every fourth pre-decoded sample is cached and the user seeks to one of the samples not in the cache, at most, three samples need be decoded to generate the desired output sample.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of processing multimedia data, the method comprising:
    generating a topology of connections between one or more multimedia components in a topology generating element, the topology describing the one or more multimedia components, and the connections between them, including a set of input multimedia streams, one or more sources for the input multimedia streams, a sequence of operations to perform on the multimedia data, and a set of output multimedia streams;
    transmitting, by a media session, the topology to a media processor, wherein the media processor and the topology generating element are controlled by the media session and wherein the media session is controlled by a media engine that provides an interface to a control application;
    implementing, by the media processor, the topology by instantiating and setting up the one or more multimedia components as described by the topology, implemented topology of one or more multimedia components operable to process the multimedia data; and
    passing the multimedia data according to the implemented topology, the passing governed by the media processor wherein the media processor is responsible for communications between the one or more multimedia components and wherein the multimedia data flows between the media processor and the one or more multimedia components rather than directly between the one or more multimedia components themselves, wherein the multimedia data flows from the one or more sources into the media session and then out of the media session and into the media processor where the multimedia data is passed between the media processor and the one or more multimedia components and then out of the media processor and into a media sink.

2. The method of claim 1 further comprising performing the sequence of multimedia operations on the multimedia data to create the set of output multimedia streams.

3. The method of claim 1 wherein the multimedia components are software objects.

4. The method of claim 1 wherein the topology generating element is a topology loader.

5. The method of claim 1 wherein the topology generating element is an application program.

6. The method of claim 1 wherein the media processor exposes the multimedia data to an application.

7. The method of claim 1 wherein the media processor accepts the multimedia data via being configured as a media sink.

8. A system for processing multimedia data, the system comprising:
    a control layer configured to receive instructions from an application, the control layer including:
        a topology generating element configured to generate a topology describing objects including a set of input multimedia streams, one or more sources for the input multimedia streams, a sequence of operations to perform on the multimedia data, and a set of output multimedia streams, the topology implementing element operable to instantiate and set up the objects as described by the topology, thus forming an implemented topology, the implemented topology comprised of instantiated objects and operable to process the multimedia data; and
    a media processor configured to govern the passing of the multimedia data to the implemented topology as described in the topology, the topology transmitted to the media processor by a media session, wherein the media processor is responsible for communications between the objects and wherein the multimedia data flows between the media processor and the objects rather than directly between the objects themselves, and governs the performance of the sequence of multimedia operations on the multimedia data to create the set of output multimedia streams, wherein the media processor and the topology generating element are controlled by the media session, wherein the multimedia data flows from the one or more sources into the media session and then out of the media session and into the media processor where the multimedia data is passed between the media processor and the one or more multimedia components and then out of the media processor and into a media sink;
    a core layer coupled to the control layer, the core layer configured to include:
        the input media streams;
        the sources for the input multimedia streams;
        one or more transforms configured to operate on the multimedia data;
        one or more stream sinks coupled to the control layer; and
        one or more media sinks configured to provide the set of output multimedia streams.

9. The system of claim 8 wherein the multimedia components are software objects.

10. The system of claim 8 wherein the topology generating element is a topology loader.

11. The system of claim 8 wherein the topology generating element is an application program.

12. The system of claim 8 wherein the media processor exposes the multimedia data to an application.

13. The system of claim 8 wherein the media processor accepts the multimedia data via being configured as a media sink.

14. A computer readable medium having stored therein instructions for performing acts for processing multimedia data, the acts comprising:

generating a topology of connections between one or more multimedia components in a topology generating element, the topology describing the one or more multimedia components, and the connections between them, including a set of input multimedia streams, one or more sources for the input multimedia streams, a sequence of operations to perform on the multimedia data, and a set of output multimedia streams;

transmitting, by a media session, the topology to a media processor, wherein the media processor and the topology generating element are controlled by the media session and wherein the media session is controlled by a media engine that provides an interface to a control application;

implementing, by the media processor, the topology by instantiating and setting up the one or more multimedia components as described by the topology, the implemented topology of one or more multimedia components operable to process the multimedia data; and passing the multimedia data according to the implemented topology, the passing governed by the media processor wherein the media processor is responsible for all communications between the one or more multimedia components and wherein the multimedia data flows between the media processor and the one or more multimedia components rather than directly between the one or more multimedia components themselves, wherein the multimedia data flows from the one or more sources into the media session and then out of the media session and into the media processor where the multimedia data is passed between the media processor and the one or more multimedia components and then out of the media processor and into a media sink.

15. The computer readable medium of claim 14 further comprising performing the sequence of multimedia operations on the multimedia data to create the set of output multimedia streams.

16. The computer readable medium of claim 14 wherein the multimedia components are software objects.

17. The computer readable medium of claim 14 wherein the topology generating element is a topology loader.

18. The computer readable medium of claim 14 wherein the topology generating element is an application program.

19. The computer readable medium of claim 14 wherein the media processor exposes the multimedia data to an application.

20. The computer readable medium of claim 14 wherein the media processor accepts the multimedia data via being configured as a media sink.

* * * * *